UNITED STATES PATENT OFFICE.

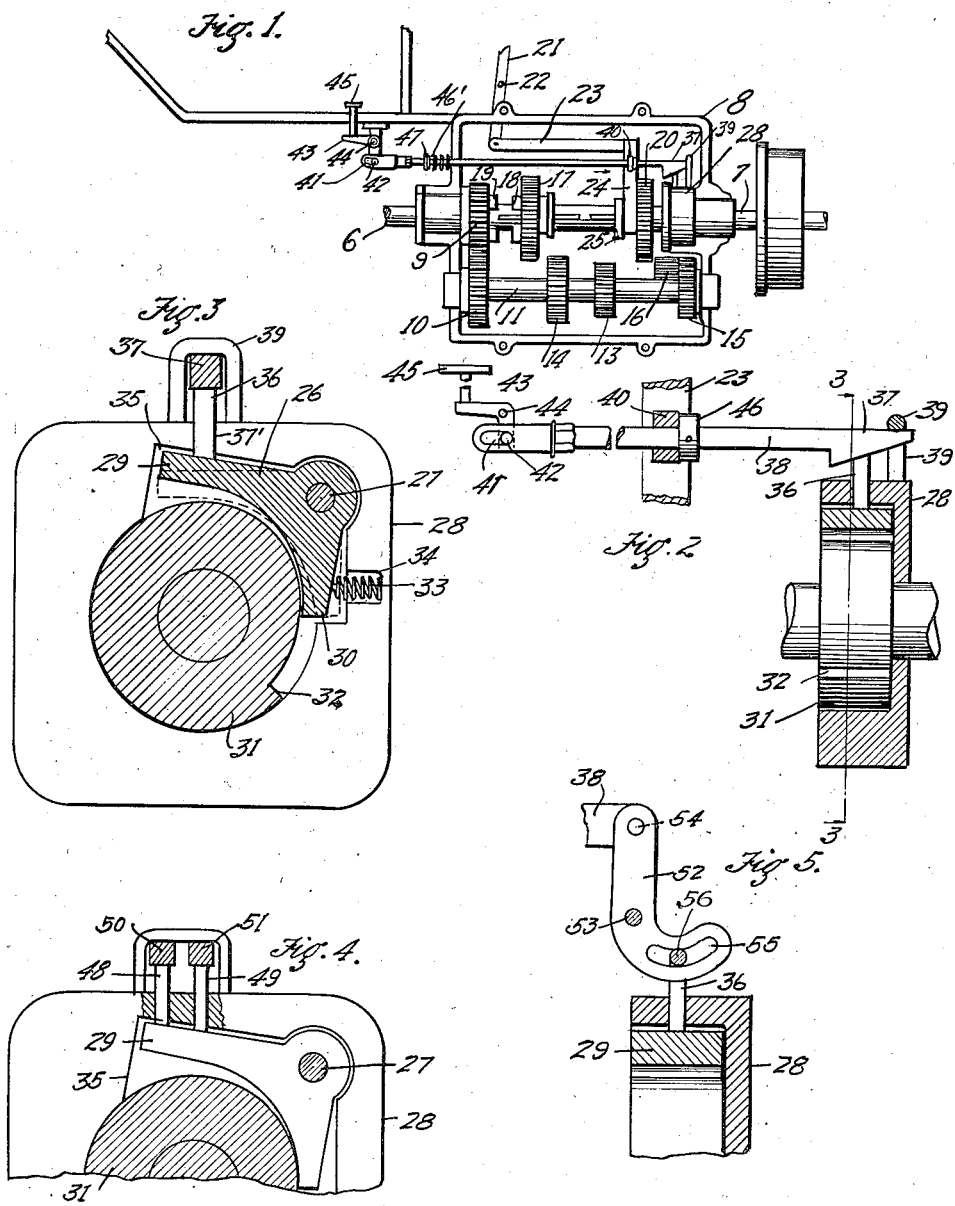

AGOSTINE J. ORELLI, OF GEORGETOWN, CALIFORNIA.

SAFETY-BRAKE FOR AUTOMOBILES AND OTHER VEHICLES.

1,149,779.  Specification of Letters Patent.  Patented Aug. 10, 1915.

Application filed April 15, 1914. Serial No. 831,949.

*To all whom it may concern:*

Be it known that I, AGOSTINE J. ORELLI, a citizen of the United States, residing at Georgetown, in the county of Eldorado, State of California, have invented new and useful Improvements in Safety-Brakes for Automobiles and other Vehicles, of which the following is a specification.

This invention relates to a safety brake for automobiles and other vehicles.

In the operation of motor vehicles great difficulty is frequently encountered in climbing steep grades by reason of the stalling of the motive power, thus necessitating the application of the brakes in order to prevent the vehicle from traveling backward down grade. This is objectionable in that the brakes may fail to operate and further necessitates releasing of the brakes before starting to drive the vehicle forward, which operation can not be effected quick enough to prevent a slight rearward movement of the vehicle before the propelling mechanism will operate to move it ahead, thus imposing an additional load upon the motive power in overcoming this backward movement.

It is the object of this invention to provide a simple auxiliary braking device for overcoming the above difficulties and by which accidental reverse movement of the vehicle will be effectively prevented.

A further object is to provide means for automatically throwing the auxiliary braking device out of operation on operating the vehicle reversing mechanism.

A further object is to provide a device of the above character, which can be readily applied to most motor vehicles now generally in use.

The invention primarily resides in a spring-pressed pawl adapted to normally engage a shoulder formed on the propeller shaft of the vehicle to prevent backward rotation of same, means connected with the reversing mechanism of the vehicle adapted to automatically retract the pawl out of engageable relation with the propeller shaft on operating the reversing mechanism to reverse the vehicle, and means operable independent of the reversing mechanism for actuating the pawl to move it to its inoperative position.

The invention is illustrated in the accompanying drawings, in which:

Figure 1 is a vertical section and elevation of the gear box of a power propelled vehicle, showing the invention as applied. Fig. 2 is an enlarged detail view of the invention, partly in section and partly in elevation. Fig. 3 is an enlarged section on the line 3—3 of Fig. 2, as seen in the direction indicated by the arrows. Figs. 4 and 5 are sectional views illustrating modified forms of the invention.

More specifically, 6 indicates the motor shaft and 7 indicates the propeller shaft by which the vehicle is propelled; these shafts extending into the usual gear box 8 in which the change-speed and reverse gears are mounted. The gears in the box 8 consist of any suitable type of transmission and reverse gears and are here shown as comprising a pinion 9 rigidly mounted on the motor shaft 6, which constantly meshes with a gear 10 on a lay shaft 11 having the first and second speed wheels 13 and 14, respectively, mounted thereon and also fitted with the reversing gear 15 meshing with an idler pinion 16. The propeller shaft 7 is fitted with a shifting gear 17, which is splined thereon and is adapted to have clutch members 18 thereon engaged with corresponding clutch members 19 on the pinion 9 when it is desired to drive the propeller shaft 7 direct from the motor shaft 6 and be shifted into engagement wih the pinion 14 when it is desired to drive the propeller shaft with intermediate speed.

A reverse gear 20 is keyed on the propeller shaft 7 and is adapted to be moved into engagement with the idler gear 16 when it is desired to reverse the direction of rotation of the propeller shaft; this shifting of the reverse gear 20 being effected by means of a lever 21 pivoted at 22 and connecting with an arm 23 on a yoke 24 engaging the hub 25 of the reverse gear 20.

The essence of the present invention resides in a means for normally locking the propeller shaft against accidental reverse movement so arranged as to be actuated on the throwing in of the reverse gear 20 to release the propeller shaft 7. This device includes a pawl 26 pivoted at 27 in a housing 28 preferably arranged within the gear box 8. The pawl 26 is formed with its end portions 29 and 30 extending at right angles to each other and is arranged adjacent a collar 31 formed on the propeller shaft 7 and which collar is formed with a spirally formed periphery with a radial shoulder 32 disposed at the juncture of the curved peripheral surfaces.

The end 30 of the pawl 26 is held in contact with the periphery of the collar 31 by means of a spring 33 seated in a recess 34 in the housing 28 and bearing against the outer face of the portion 30 of the pawl. The outer end 29 of the pawl extends in a recess 35 in the housing 28, and in the form of the invention shown in Figs. 1, 2 and 3, has its upper face in contact with a loose pin 36 guided in a perforation 37' in the upper face of the housing 28. The upper end of the pin 36 abuts against the inclined face of a wedge 37 formed on the outer end of a reciprocal rod 38 which is guided in a strap 39 carried by the case 28.

The forward end of the rod 38 extends in an apertured lug 40 on the arm 23 and has a slotted yoke 41 on its forward end. The slots engage pins 42 on the bell crank lever 43 pivoted at 44 and connecting with a foot treadle 45. The collar 46 is rigidly mounted on the rod 38 and normally acts against the rear face of the lug 40 in which position it is maintained by a spring 46', which bears between the outer wall of the case 8 and the collar 47 on the rod 38, as shown in Fig. 1. The pawl 26 being thus normally in contact with the peripheral surface of the collar 31 will operate on the accidental reverse movement of the latter to engage the shoulder 32 to lock the propeller shaft against rearward rotation. In the event it is desired to permit this rearward rotation of the propeller shaft the foot treadle 45 is depressed, thereby reciprocating the rod 38 rearwardly in its bearings and causing the wedge 37 to act on the pin 36, thereby depressing the outer arm 29 of the bell crank lever in opposition to the spring 23 into the position indicated in dotted lines in Fig. 3, whereupon the propeller shaft will be free to rotate in its rearward direction. On releasing the foot lever 45 the spring 46' will act to restore the rod 38 to its normal position, thereby permitting the spring 33 to restore the pawl 26 to its normal position.

In moving the reverse gear 20 into engagement with the idler 16 to reverse the direction of rotation of the propeller shaft 7, the rearward movement of the arm 23 causes the lug 40 thereon to engage the collar 46 and move the rod 38 rearward therewith, thus depressing the pin 36 and rocking the pawl 26 into its inoperative position as before described; the pawl 26 being thus automatically moved to its inoperative position on the operation of the reversing mechanism.

In some instances it may be desirable to provide separate means for actuating the pawl 26 by the foot lever 45 or the hand lever 21 in which case a pair of pins 48 and 49 are provided which normally seat on the upper face of the cam portion 29 and are engaged at their upper ends by wedge-shaped heads 50 and 51 carried on separate rods, one of which connects with the foot lever and the other with the hand lever so that they may be operated independent of each other. This arrangement is particularly shown in Fig. 4.

In the modified form of the invention shown in Fig. 5, the pin 36 is shown as connected to a lever 52 pivoted at 53 connected at 54 to the rod 38 and having a cam slot 55 formed therein eccentric to the pivot 53 which engages a lateral projection 56 of the pin 36 in such manner that when the lever 52 is rocked the pin 36 may be reciprocated to move it either out of contact with the portion 29 of the pawl 26 or to bear down upon said arm to move the pawl to its inoperative position.

The operation of the invention is apparent from the foregoing, it being seen that the pawl may be positioned to normally engage the shoulder 32 on the collar 31 in event the propeller shaft 7 is rotated in a reverse direction as would be occasioned by backward movement of the vehicle. When it is desired to permit this backward movement the pawl will be moved to its inoperative position by depression of the foot treadle 45.

While the invention has been described as applied to operate on the propeller shaft of the vehicle, it is manifest that it may be arranged to operate on the driving axle thereof.

What I claim is:

1. The combination with a propeller shaft provided with a collar formed with a shoulder on its periphery and gear shifting means for controlling the reverse movement of said propeller shaft, of a spring pressed pawl normally positioned in engageable relation with said shoulder, whereby reverse movement of the propeller shaft is inhibited, and means automatically controlled by the reverse gear shift mechanism for moving the pawl to an inoperative position when it is desired to drive the propeller shaft in its reverse direction.

2. The combination with a propeller shaft, means for propelling same, and gear shift mechanism for reversing the direction of rotation of the propeller shaft, of means normally operable to engage the propeller shaft to prevent its reverse rotation when the reverse gear mechanism is thrown out, and means automatically actuated by the throwing in of the reverse gear mechanism, whereby the propeller shaft engaging means is rendered inoperative when the reverse gears are thrown in.

3. The combination with a rotary member on a vehicle, having a shoulder formed thereon, of a spring pressed pawl normally adapted to engage said shoulder to prevent reverse rotation of said member, propelling means for rotating said member in either direction, means for controlling said propelling mechanism, and means for automatically throwing said pawl into inoperative position on operating the propelling controlling means to reverse the direction of said rotary member.

4. The combination of a propeller shaft, a shoulder formed thereon, a spring-pressed pawl arranged to normally engage the shoulder to prevent reverse rotation of the propeller shaft, a gear shift mechanism for reversing the direction of rotation of said propeller shaft, means connected with the gear shift mechanism adapted to automatically retract the pawl before engagement with the propeller shaft on operating the gear shift mechanism to reverse the rotation of the propeller shaft, and means operable independent of the gear shift mechanism for actuating the pawl to move it to its inoperative position.

5. A device for normally locking a propeller shaft against reverse movement, comprising a collar having a spirally formed periphery with a radial shoulder thereon mounted on the propeller shaft, a stationary housing encompassing the shaft and its collar having a recess therein, a pawl pivotally mounted in said recess having end portions extending at right angles to each other, a spring bearing against one of the end portions of said pawl to normally maintain it in contact with the spiral periphery of the collar in position to engage the shoulder on the latter on reverse rotation of the propeller shaft, a loose pin guided in the housing and bearing on the pawl adjacent its other end, and a member having an inclined face engageable with said pin adapted to operate on the shifting of said member to advance the pin and rock the pawl into an operative position.

In witness that I claim the foregoing I have hereunto subscribed my name this 6th day of April, 1914.

AGOSTINE J. ORELLI.

Witnesses:
C. D. HOTCHKISS,
P. F. MORGAN.